July 24, 1928.    1,678,384

B. P. GRAVES

VARIABLE SPEED DRIVING MECHANISM

Filed Jan. 4, 1927

Inventor
Benjamin P. Graves
by Van Everen, Fish,
Hildreth & Hearty Attys.

Witness
Jas. F. Maloney.

Patented July 24, 1928.

1,678,384

UNITED STATES PATENT OFFICE.

BENJAMIN P. GRAVES, OF CRANSTON, RHODE ISLAND, ASSIGNOR TO BROWN AND SHARPE MANUFACTURING COMPANY, A CORPORATION OF RHODE ISLAND.

VARIABLE-SPEED DRIVING MECHANISM.

Application filed January 4, 1927. Serial No. 158,889.

The invention relates to variable speed driving mechanisms and more particularly to variable speed spindle driving mechanisms for milling machines.

The object of the invention is to provide a novel and improved driving mechanism of this description which will be more compact and simple in construction for the same obtainable number of speed variations than those heretofore devised and which, at the same time, will be stronger and better suited to stand the heavy strains of machine tool work.

Figure 1:
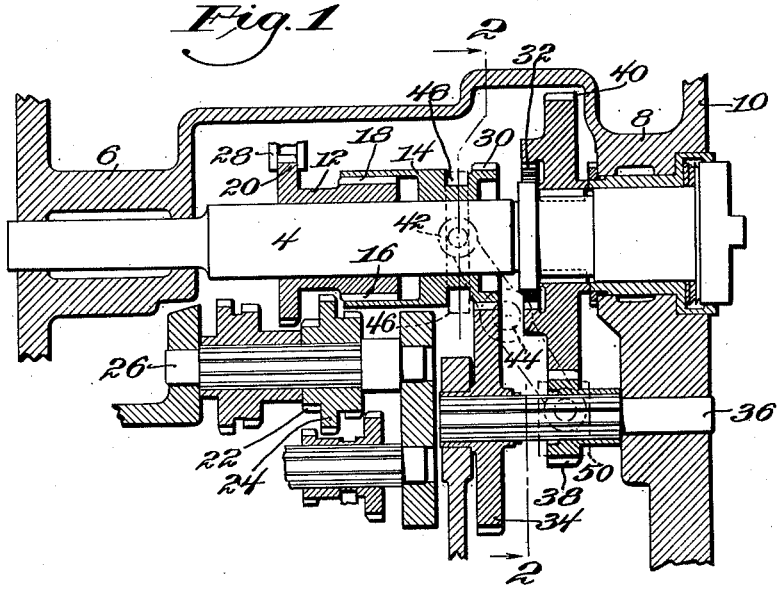
Figure 2:
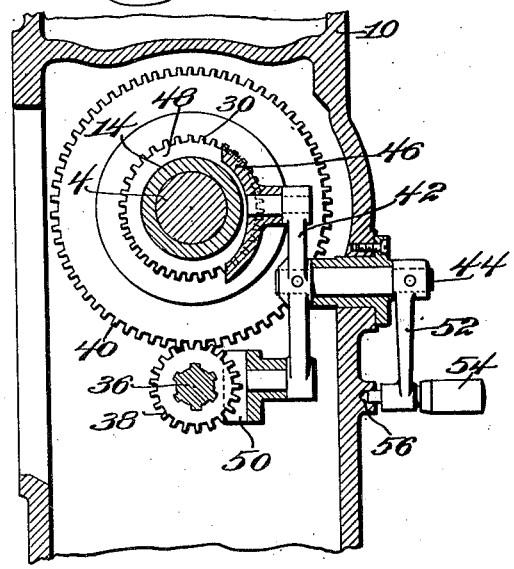

With this end in view, the several features of the invention consist in the devices, combinations and arrangement of parts hereinafter described and claimed which, together with the advantages to be obtained thereby, will be readily understood by those skilled in the art from the following description taken in connection with the accompanying drawings, in which Fig. 1 is a sectional view of a portion of a variable speed spindle driving mechanism embodying the present invention, and Fig. 2 is a cross sectional view of the mechanism taken on the line 2—2 of Fig. 1.

The invention is herein disclosed as embodied in a variable speed mechanism for driving the spindle of a milling machine of the same general description as that disclosed in the patent to the present inventor, No. 1,480,900.

In carrying out the invention, two sleeves having gears formed thereon, which sleeves with their gears may for convenience be termed sleeve gears are loosely mounted directly on the spindle. The sleeve gears have a spline connection which maintains them at all times in driving relation so that one sleeve gear is driven from the other while an independent sliding movement axially of the spindle is permitted to each sleeve gear. The sliding movement of one sleeve gear is utilized in bringing its gears into different relations to the gears of a change speed gear set and the sliding movement of the other sleeve gear is utilized in connecting the sleeve gear either directly to the spindle or indirectly through back gearing. This arrangement of sleeve gears results in an extremely compact and sturdy construction permitting the use of a relatively large and strong spindle without an objectionable or undesirable increase in the space occupied in the machine by the spindle and its driving mechanism. In the construction hereinafter described the spline connection between the two sleeve gears comprises internal clutch teeth formed on one of the sleeves and an external gear meshing therewith formed on the other sleeve. An important feature of the present invention consists in utilizing this external gear to mesh with one of the gears of the change speed gear set in one of the axial positions of the sleeve. The internal clutch teeth and external gear together form a strong and compact driving connection between the sleeves and by utilizing the external gear also to mesh with one of the change speed gears the construction is simplified and the amount of space in the machine which would otherwise be occupied is reduced.

Referring to the drawings, the spindle is indicated at 4, journaled in suitable bearings 6 and 8 in the machine frame 10. Two sleeves 12 and 14 are loosely mounted direcly on the spindle and are held in driving relation by means of an external gear 16 on the sleeve 12 and the intermeshing internal clutch teeth 18 formed on a projecting flange of the sleeve 14. With this arrangement of the parts, the sleeves have a spline connection so that they rotate together although independently of the spindle and at the same time may be moved independently of each other axially along the spindle.

The sleeve 12, in addition to the gear 16, is provided with a gear 20 and may be moved in either direction from the neutral position illustrated in Fig. 1 into driving relation with the gears 22 and 24 mounted on the shaft 26, which forms a part of the spindle change speed gearing. The movement of the sleeve 12 is controlled by means of a U-shaped bracket 28 which engages the gear 20. When the sleeve 12 is moved to the right as viewed in Fig. 1, the gear 20 is brought into engagement with the gear 22 to secure one driving relation of the parts, and as the sleeve 12 is moved to the left away from the sleeve 14, the gear 16 is brought into engagement with the gear 24 to secure another driving relation of the gearing.

The spindle 4 is driven from the sleeves 12 and 14 through a gear 30 formed on the sleeve 14 which is adapted to mesh with the internal clutch teeth 32 mounted on the spindle to secure a direct spindle drive or with the back gear 34 mounted on the shaft 36 for another driving relation of the parts. The spindle is driven from the back gear 34 through a gear 38 splined to the shaft 36 and adapted to engage the gear 40 fixed to the spindle 4. The sleeve 14 may be moved to the right as viewed in Fig. 1 to drive the spindle directly by the engagement of the gear 30 and clutch teeth 32 or to the left to drive the spindle through the back gears as above described by means of connections which comprise a lever arm 42 pivotally mounted on a shaft 44. The lever arm 42 is provided at one end with a collar 46 adapted to ride in a groove 48 on the sleeve 14 and has pivotally mounted on its other end, the U-shaped bracket 50 which embraces the gear 38. The arm 42 is rotated and held adjustably in position by means of a lever arm 52 mounted on the shaft 44 and provided at its outer end with a spring pressed plunger 54 which is adapted to engage corresponding recesses 56 formed on the machine frame. With this construction it will be seen that as the sleeve 14 is moved to the right into direct driving relation with the spindle 4, the gear 38 also will be moved out of engagement with the gear 40 completely disengaging the back gearing from the spindle.

The invention having been described and illustrated, what is claimed is:

1. In a variable speed spindle driving mechanism, the combination of a spindle, a sleeve gear loosely mounted directly on the spindle, a second sleeve gear loosely mounted directly on the spindle and permanently splined to the first sleeve gear in driving relation thereto, back gearing for driving the spindle from one of the sleeve gears and means for disconnecting the back gearing and for connecting said sleeve gear directly to the spindle.

2. In a variable speed spindle driving mechanism, the combination of a spindle, a set of change speed gears from which the spindle is driven, two sleeve gears loosely mounted directly on the spindle to slide independently of each other while secured together in driving relation, means for positioning one sleeve gear to secure a plurality of driving relations with the change speed gear set, back gearing for driving the spindle from the remaining sleeve gear, means for connecting said remaining sleeve gear directly to the spindle, and means for moving said sleeve gear alternately to drive the spindle directly or indirectly through the back gears.

3. In a variable speed spindle driving mechanism, the combination of a spindle, a set of change speed gears from which the spindle is driven, two sleeve gears loosely mounted on the spindle to slide independently of each other while secured together in driving relation, means for positioning one sleeve gear to secure a plurality of driving relations with the change speed gear set, a set of back gears for driving the spindle from the remaining sleeve gear, an internal clutch toothed member secured to the spindle, and a gear mounted on said remaining sleeve gear adapted to drive the spindle indirectly through the back gears or directly through the engagement of its teeth with the teeth of the internal clutch toothed member.

4. In a variable speed spindle driving mechanism, the combination of a spindle, a set of variable speed gears from which the spindle is driven, sleeve gears loosely mounted on the spindle, a splined connection comprising an external gear and internal clutch teeth meshing therewith for holding the sleeve gears in driving relation while permitting them to slide independently of each other, the external gear being adapted in one position of the sleeve gear of whch it is a part to engage a driving gear, means for positioning the said sleeve gear to secure a plurality of driving relations with the change gear speed set, back gearing for driving the spindle from the remaining sleeve gear, an internal clutch toothed member secured to the spindle, and a gear mounted on said remaining sleeve gear adapted to drive the spindle indirectly through the back gears or directly through the engagement of its teeth with the teeth of the internal clutch toothed member.

5. In a variable speed spindle driving mechanism the combination of a spindle, a set of variable speed driving gears, sleeve gears loosely mounted on the spindle, a splined connection comprising an external gear and internal clutch teeth meshing therewith for holding the sleeve gears in driving relation while permitting them to slide independently of each other, the external gear being adapted in one position of the sleeve gear of which it is a part to engage a driving gear, means for positioning the said sleeve gear to secure a plurality of driving relations with the change speed gear set, back gears adapted to engage with the second sleeve gear set to drive the spindle, means for connecting this second sleeve gear set directly to the spindle, and means for positioning the second sleeve gear set alternately to engage the back gears and to engage directly with the spindle.

6. In a variable speed spindle driving mechanism the combination of a spindle, a set of change speed gears from which the spindle is driven, two sleeve gears loosely mounted on the spindle, a splined connection comprising an external gear and internal clutch teeth meshing therewith for holding the sleeve gears in driving relation while permitting them to slide independently of each other, means for positioning one sleeve gear to secure a plurality of driving relations with the change speed gear set, a set of back gears for driving the spindle from the remaining sleeve gear, an internal clutch toothed member secured to the spindle, and a gear mounted on said remaining sleeve gear adapted to drive the spindle indirectly through the back gears or directly through the engagement of its teeth with the teeth of the internal clutch toothed member.

In testimony whereof I have signed my name to this specification.

BENJAMIN P. GRAVES.